United States Patent
Chigurupati et al.

(10) Patent No.: US 10,042,722 B1
(45) Date of Patent: Aug. 7, 2018

(54) SERVICE-CHAIN FAULT TOLERANCE IN SERVICE VIRTUALIZED ENVIRONMENTS

(71) Applicant: Juniper Networks, Inc., Sunnyvale, CA (US)

(72) Inventors: Prasad Chigurupati, Bangalore (IN); Sarvesh K. Batta, Bangalore (IN); Venkatesh Br Gota, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 111 days.

(21) Appl. No.: 14/748,113

(22) Filed: Jun. 23, 2015

(51) Int. Cl.
G06F 11/00 (2006.01)
G06F 11/18 (2006.01)

(52) U.S. Cl.
CPC .................. G06F 11/181 (2013.01)

(58) Field of Classification Search
CPC ..................................................... G06F 11/181
See application file for complete search history.

(56) References Cited

U.S. PATENT DOCUMENTS

| | | | |
|---|---|---|---|
| 7,184,437 B1 | 2/2007 | Cole et al. | |
| 8,050,559 B2 | 11/2011 | Sindhu | |
| 8,199,654 B2 * | 6/2012 | Francisco | H04L 12/2602 370/238 |
| 8,542,578 B1 * | 9/2013 | Filsfils | G06F 11/00 370/228 |
| 9,686,181 B2 * | 6/2017 | Akiya | H04L 45/28 |
| 2002/0174207 A1 * | 11/2002 | Battou | G06F 8/65 709/223 |
| 2010/0265957 A1 * | 10/2010 | Foxworthy | H04B 7/18584 370/401 |
| 2011/0185067 A1 * | 7/2011 | Finn | H04L 47/2491 709/226 |
| 2013/0343174 A1 * | 12/2013 | Guichard | H04L 45/22 370/218 |
| 2014/0129873 A1 * | 5/2014 | McGill | G06F 11/1662 714/4.11 |
| 2014/0351210 A1 * | 11/2014 | Kawachi | G06F 17/30575 707/623 |
| 2014/0355436 A1 * | 12/2014 | Zhang | H04L 47/10 370/232 |

(Continued)

FOREIGN PATENT DOCUMENTS

WO 2013/184846 A1 12/2013

*Primary Examiner* — Christopher S McCarthy
(74) *Attorney, Agent, or Firm* — Shumaker & Sieffert, P.A.

(57) ABSTRACT

In some examples, techniques are directed to applying one or more corrective actions that cause the network device to bypass the failed service node of the service chain. In some examples, method includes determining that a failure has occurred at a service node included in a plurality of service nodes, the plurality of service nodes configured to apply one or more stateful services of a primary service chain to packet flows from a plurality of subscriber devices; in response to determining that the failure has occurred, configuring forwarding state of the network device to process the packet flows from the plurality of subscriber devices based on a corrective action that bypasses the service node of the primary service chain; and in response to receiving a subscriber packet in the packet flows, processing the packet flows from the plurality of subscriber devices based on the corrective action.

21 Claims, 5 Drawing Sheets

(56) References Cited

U.S. PATENT DOCUMENTS

| | | | |
|---|---|---|---|
| 2015/0003283 A1* | 1/2015 | Previdi | H04L 41/12 |
| | | | 370/254 |
| 2015/0172104 A1* | 6/2015 | Brandwine | H04L 69/40 |
| | | | 709/224 |
| 2016/0337209 A1* | 11/2016 | Guichard | H04L 41/5038 |
| 2017/0019303 A1* | 1/2017 | Swamy | H04L 41/5041 |

* cited by examiner

US 10,042,722 B1

SERVICE-CHAIN FAULT TOLERANCE IN SERVICE VIRTUALIZED ENVIRONMENTS

TECHNICAL FIELD

The disclosure relates to computer networks and, more specifically, to applying network services to subscriber data traffic traversing computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information.

Network service providers provide services such as security, tunneling, virtual private networks, filtering, load-balancing, VoIP/Multimedia processing and various types of application proxies (HTTP, XML, WAP, etc) to incoming packets. Service providers also provide content-specific services designed to improve the quality of a user's experience, for example, video streaming and caching. To provide these new services, service providers have often turned to dedicated appliances that include one or more service nodes, where each service node applies a particular service.

A set of services applied by the service nodes to network traffic of a subscriber may be referred to as a "service chain." When network traffic from a subscriber is received by a service provider, each service node applies its respective service to the network traffic. If one or more service nodes experience outages or cannot otherwise apply the respective services, the complete set of services in the service chain may not be applied to network traffic for a subscriber.

SUMMARY

The techniques described herein are generally directed to detecting by a network device that a failure has occurred at a service node that applies one or more stateful services of a service chain to packet flows. In response to detecting the failure, the network device may apply one or more corrective actions that cause the network device to bypass the failed service node of the service chain. For instance, a network device operating as a gateway for subscriber devices may forward the subscriber packet flows to one or more service nodes that each apply a stateful service of a service chain to the packet flows. The network device may communicate with one or more service nodes of the service chain to determine that each service node is operational and applying its respective service. If the network device determines that a service node has failed, the network device may identify one or more service chains that include the service provided by the failed service node. The network device may take one or more corrective actions for the affected service chains, such as forwarding the packet flows without applying services or re-routing the packet flows to a different set of service nodes that apply services of an alternative service chain. In this way, if a failure occurs at a service node that has one or more predecessor service nodes in a service chain, techniques of the disclosure may reduce or eliminate wasteful processing of the packet flows by the predecessor service nodes, which would otherwise occur prior to the packets being dropped at the failed service node.

In some examples, a method includes determining, by a network device of a service provider network, that a failure has occurred at a service node included in a plurality of service nodes, the plurality of service nodes configured to apply one or more stateful services of a primary service chain to packet flows from a plurality of subscriber devices; in response to determining that the failure has occurred, configuring, by the network device, forwarding state of the network device to process the packet flows from the plurality of subscriber devices based on a corrective action that bypasses the service node of the primary service chain; and in response to receiving a subscriber packet in the packet flows, processing the packet flows from the plurality of subscriber devices based on the corrective action.

In some examples, a network device includes: a monitoring module that determines that a failure has occurred at a service node included in a plurality of service nodes, the plurality of service nodes configured to apply one or more stateful services of a primary service chain to packet flows from a plurality of subscriber devices; a control unit that, in response to determining that the failure has occurred, configures a forwarding state of the network device to process the packet flows from the plurality of subscriber devices based on a corrective action that bypasses the service node of the primary service chain; and a forwarding unit that, in response to receiving a subscriber packet in the packet flows, processes the packet flows from the plurality of subscriber devices based on the corrective action.

In some examples, a computer-readable medium includes instructions for causing at least one programmable processor of a network device to: determine that a failure has occurred at a service node included in a plurality of service nodes, the plurality of service nodes configured to apply one or more stateful services of a primary service chain to packet flows from a plurality of subscriber devices; configure forwarding state of the network device to process the packet flows from the plurality of subscriber devices based on a corrective action that bypasses the service node of the primary service chain, in response to determining that the failure has occurred; and process the packet flows from the plurality of subscriber devices based on the corrective action, in response to receiving a subscriber packet in the packet flows.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
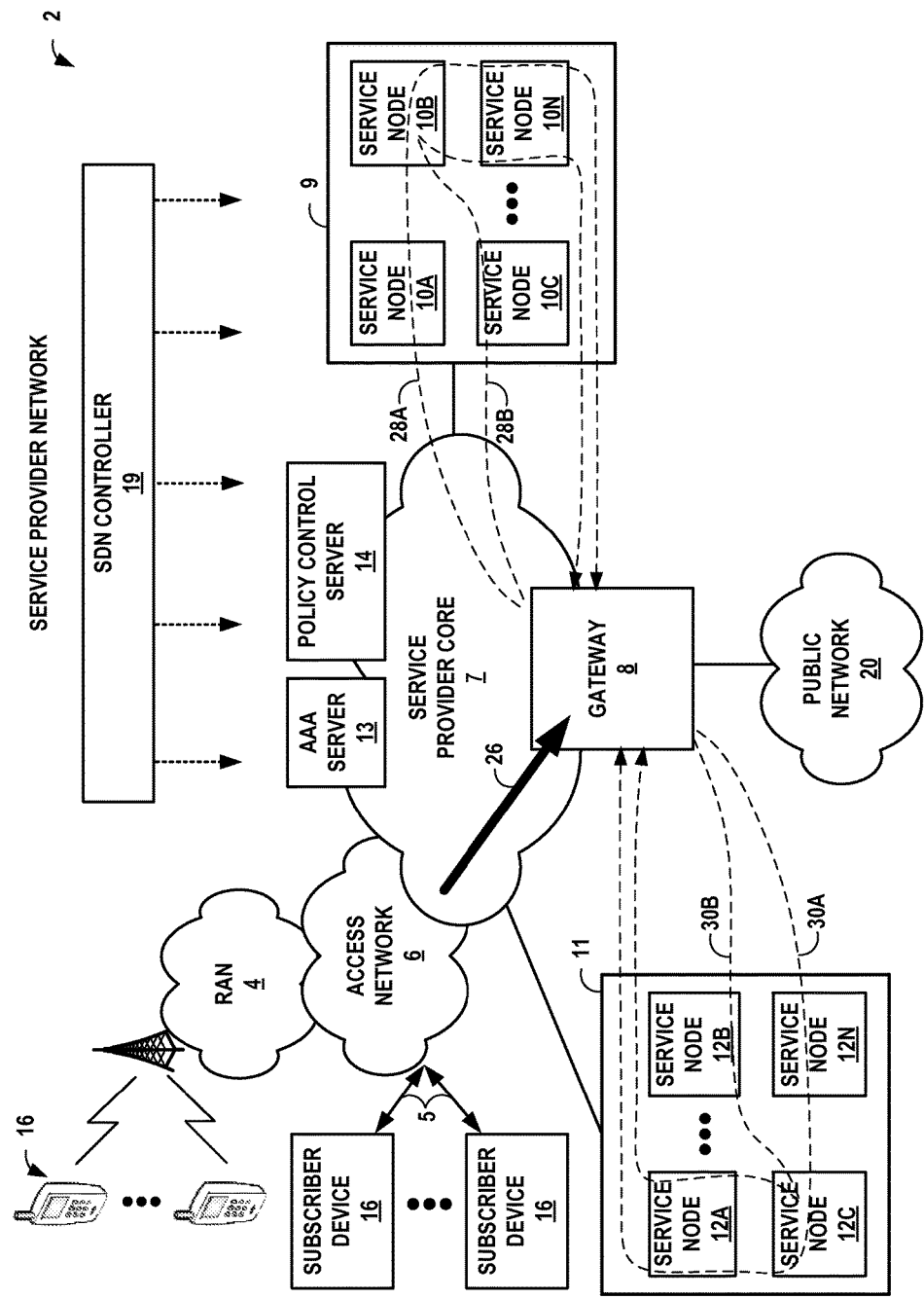
FIG. 1 illustrates an example network system, in accordance with techniques described herein.

FIG. 1 illustrates an example network system, in accordance with techniques described herein. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with public network 20, which may be an internal or external packet-based network such as the Internet.

In the example of FIG. 1, service provider network 2 comprises access network 6 ("access network 6") that provides connectivity to public network 20 via service provider core network 7 and gateway 8. Service provider core network 7 and public network 20 provide packet-based services that are available for request and use by subscriber devices subscriber devices 16. As examples, core network 7 and/or public network 20 may provide, for example, bulk data delivery, voice over Internet protocol (VoIP), Internet Protocol television (IPTV), Short Messaging Service (SMS), Wireless Application Protocol (WAP) service, or customer-specific application services. Public network 20 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 20 is connected to a public WAN, the Internet, or to other networks. Packet data network 20 executes one or more packet data protocols (PDPs), such as IP (IPv4 and/or IPv6), X.25 or Point-to-Point Protocol (PPP), to enable packet-based transport of public network 20 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 20 may represent an edge network coupled to core network 7, e.g., by a customer edge device such as customer edge switch or router. Public network 20 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 13 to authenticate the subscriber device requesting network access. Once authenticated, any of subscriber devices 16 may send subscriber data traffic toward service provider core network 7 in order to access and receive services provided by public network 20, and such packets traverse gateway 8 as part of at least one packet flow.

Flows 26 illustrated in FIG. 1 represent one or more upstream packet flows from any one or more subscriber devices 16 and directed to public network 20. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, in a Network Function Virtualized (NFV) environment such as service provider network 2, one or more services complexes 9 and 11 include clusters of service nodes 10A-10N and 12A-12N, respectively, which provide an execution environment for network services. That is, each of service nodes 10 and 12 apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 10 (and service nodes 12) in this way represents a service instance.

Although illustrated as part of services complexes 9 and 11, which may represent data centers, service nodes 10 and 12 may, for instance, be coupled by one or more switches or virtual switches of core network 7. In one example, each of service nodes 10 and 12 may run as respective virtual machines in virtual compute environments. Moreover, a compute environment may comprise a scalable cluster of general computing devices, such as x86 processor-based servers. As another example, service nodes 10 and 12 may comprise a combination of general purpose computing devices and special purpose appliances. As virtualized, individual network services provided by service nodes 10 and 12 can scale just as in a modern data center, through the allocation of virtualized memory, processor utilization, storage and network policies, as well as horizontally by adding additional load-balanced virtual machines.

As shown in FIG. 1, gateway 8 steers individual subscriber packet flows 26 through defined sets of services provided by service nodes 10 and/or 12. That is, each subscriber packet flow may be forwarded through a particular ordered combination of services provided by service nodes 10 and/or 12, each ordered set being referred to herein as a "service chain." In the example of FIG. 1, one or more subscriber packet flows 26 are directed along a first service chain 28A and, therefore, receive services applied by service nodes 10A, 10B and 10N, in that order. Similarly, one or more subscriber packet flows 26 are directed along a second service chain 28B and, therefore, receive services applied by service nodes 10C, 10B and 10N.

In this way, subscriber flows 26 may be processed by service nodes 10 and/or 12 as the packets flow between access network 6 and public network 20 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N. Accordingly, packet flows 26 processed according to service chain 28A follow a service path that traverses nodes 10A, 10B, and finally node 10N as the terminal node for the service chain 28A. A particular node 10 may support multiple service chains. In this example, service node 10B supports service chains 28A, 28B.

Once processed at a terminal node of the service chain, i.e., the last node 10 to apply services to packets flowing along a particular service path, the terminal node may direct the traffic back to gateway 8 for further processing and/or forwarding to public network 20. For example, traffic engineered service paths may start and terminate with gateway 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. Gateway 8, after authenticating and establishing access sessions for the subscribers, directs packet flows for the subscribers along the appropriate service tunnels, thereby causing service complex 9 to apply the requisite ordered services for the given subscriber.

Nodes 10 may implement service chains 28A, 28B using internally configured forwarding state that directs packets of the packet flow long the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flow to the service nodes 10 according to service chains 28A, 28B.

In FIG. 1, software-defined networking (SDN) controller 19 provides a high-level controller for configuring and managing routing and switching infrastructure of service provider network 2 (e.g., gateway 8, core network 7 and nodes 10, 12). In some instances, SDN controller 19 manages deployment of virtual machines within the operating environment of value-added services complex 9. For example, SDN controller 19 may interact with gateway 8 to specify service chain 28A, 28B information. For example, the service chain information provided by SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the entire contents of which are incorporated herein by reference.

Gateway 8 may modify packets of packet flows 26 as the gateway 8 steers the packets into appropriate service chains. For example, gateway 8 may prepend to each subscriber packet a traffic engineering header or label (e.g., an additional IP header or MPLS label) to form a "tunnel packet" in which the subscriber packet is encapsulated as a payload. At this time, gateway 8 selects the particular traffic engineering header based on the particular subscriber and, more specifically, selects the service chain to which the particular type of packet flow for the given subscriber is assigned. In other words, the processing of subscriber packet flows 26 by gateway 8 to steer the packet flows may be session-aware (i.e., based on the particular subscriber from which the packet flow originated) and may also be based on characteristics of the packet flow itself, e.g., type of flow (e.g., VoIP, HTTP, etc).

As described above, gateway 8 may authenticate subscribers requesting network access and/or operate as a service gateway that steers individual subscriber packet flows to service nodes 10 and/or 12. For instance, upon authenticating a subscriber, gateway 8 may access policy control server 14 to identify one or more policies associated with a subscriber. In some examples, gateway 8 may access the one or more policies for the subscriber based on a subscriber identifier that identifies the subscriber. For example, gateway 8 may determine the subscriber identifier when authenticating the subscriber and send the subscriber identifier to policy control server 14, which provides gateway 8 with data corresponding to one or more policies. Policy control service 14 may store or otherwise maintain information about policies and associations between the policies and subscribers.

In some examples, a policy may identify one or more services to apply to a packet flow of a subscriber. For instance, a policy may identify a service chain and/or one or more services included in a service chain. As such, the data provided by policy control server 14 to gateway 8 for a subscriber may indicate one or more service chains and/or one or more services included in one or more service chains. Gateway 8 may implement the one or more policies for a subscriber as a set of filters that are applied to packet flows of subscribers. In some examples, a filter may include one or more conditions and one or more actions. A condition may be based on a subscriber identifier, header information of a packet, and/or payload of a packet, to name only a few example conditions. An action may include one or more operations that are performed when the condition is satisfied. Accordingly, when gateway 8 determines that the conditions of a filter are satisfied, gateway 8 may perform the actions of the filter. For example, gateway 8 may configure a filter for a particular subscriber, where the condition includes a subscriber identifier and the action includes forwarding packets from the particular subscriber to service appliance 9 with a service chain identifier, such that service nodes 10 apply a set of services for a service chain to the packets.

In some instances, each of service nodes 10 may apply a different service to a packet. As such, to apply a set of services in a service chain to a packet, service appliance 9 may internally forward or otherwise send the packet to different, respective service nodes for processing in accordance with the respective service. For example, gateway 8 may send a packet from a subscriber to service appliance 9 with a service chain identifier that corresponds to service chain 28A. Accordingly, the packet may be processed by service nodes 10A, 10B, and 10N in sequence, although any ordering between service nodes 10A, 10B, and 10N may be possible. Once each of service nodes 10A, 10B, and 10N have applied its respective service, the packet is sent back to gateway 8 for forwarding to public network 20 or subscriber device 16.

Services nodes may fail for a variety of reasons. In general, a failure may refer to a service node that is unable to apply a service to a packet according to at least one threshold. For instance, a failure may refer to a service node that is unable to apply a service to a packet at all. In other examples, a failure may refer to a service that is unable to apply a service according to a threshold, such as a performance threshold. As an example, a failure may occur at a service node if the service node is operational but unable to apply services to packets at a minimum threshold rate, or the service node is applying a service at a rate that exceeds a maximum threshold. Service nodes may fail to due to a hardware failure, power outage, communication link failure, resource exhaustion (e.g., processor, memory, or network exhaustion) and/or any number of software failures, such as deadlock, race conditions, and segmentation faults to name only a few examples. As such, a packet may be dropped at a service appliance if one or more service nodes have failed. In some examples, if a failure occurs at a particular service node having an ordinality greater than 1 in an ordered set of service nodes in a service chain, then processing of the service nodes having ordinalities less than the particular service node may be wasted. For instance, in the example of service chain 28A, if service node 10N has failed, service nodes 10A and 10B may still apply respective services to network packets, at which point the packet would be dropped due to the failure of service note 10N. Such processing by service nodes 10A and 10B may be wasteful and/or introduce delays in packet processing by service appliance 9 and/or gateway 8.

In accordance with techniques of this disclosure, gateway 8 may configure a primary service chain and one or more corrective actions that gateway 8 may take if a service node fails that provides a service in the service chain. A corrective action may be any set of one or more operations. In some examples, the one or more operations may cause gateway 8 to bypass a failed service node. For instance, a corrective action may include dropping packets at gateway 8 that would otherwise be processed in a service chain by a service node. A corrective action may include forwarding packets to a destination without processing the packet in a service chain by a service node. In some examples, a corrective action may include forwarding packets for processing with an alternate service chain, such that in response to a failure of a service node that provides a service in a primary service chain, gateway 8 may steer packets to use an alternate service chain. In this way, if gateway 8 determines that a failure of a service node has occurred, gateway 8 may update its forwarding state to apply one or more corrective actions, such as using an alternative service chain, thereby potentially avoiding or reducing the number of packets that would otherwise be dropped at the failed service node. Accordingly, techniques of the disclosure may reduce or eliminate unnecessary processing by an ordered set of service nodes that have an ordinality less than the ordinality of the failed service node in the service chain.

In operation, an administrator or operator of gateway 8 and service appliances 9 and 11 may configure services nodes 10 and 12 to provide various services. For instance, a gateway 8 may maintain a service node dependency data structure, such as a table, list, array, or any other suitable data structure. For example purposes the service node dependency structure is referred to as a service node table in this disclosure. The service node dependency table may include one or more service chain identifiers, wherein each service chain identifier is associated with one or more identifiers of one or more services to be applied to a packet flow.

An administrator or operator may configure primary service chain 28A at service appliance 9 with a corresponding service chain identifier included in the service node dependency table. The administrator or operator may configure primary service chain 28B at service appliance 9 with a corresponding service chain identifier included in the service node dependency table. Accordingly, when a packet is received from a subscriber, gateway 8 may determine that a condition of a filter is satisfied for the subscriber identifier, determine a service chain identifier from the action for the filter, and, based on the action, send the packet to service appliance 9 with the service chain identifier. Service appliance 9 may apply the services in the service chain to the packet based on the service chain identifier and send the packet back to gateway 8 for forwarding.

In accordance with techniques of the disclosure, in addition to configuring primary service chain 28A and primary service chain 28B, the administrator or operator may also configure alternate service chain 30A at service appliance 11 with a corresponding service chain identifier included in the service node dependency table. The administrator or operator may configure alternate service chain 30B at service appliance 11 with a corresponding service chain identifier included in the service node dependency table. In some examples, alternate service chain 30A may provide an alternative service chain to primary service chain 28A and alternate service chain 30B may provide an alternative service chain to primary service chain 28B. For instance, alternate service chain 30A may provide the same set of services as primary service chain 28A. In other examples, alternate service chain 30A may provide a subset or superset of the services included in primary service chain 28A.

The administrator or operator may initially configure gateway 8 to send packets to primary service chains 28A and 28B for application of services. That is, if gateway 8 receives a policy that requires the application of services in primary service chain 28A, gateway 8 may configure its forwarding state with a filter that, when satisfied for a packet, forwards the packet to service appliance 9, such that services of nodes 10A, 10B, and 10N in service chain 28A are applied to the packet. As further described in this disclosure, the administrator or operator may configure gateway 8 with a corrective action that, in the event of a failure at one or more nodes that apply services in service chain 28A, sends packets to alternate service chain 30A for application of services to packets that would otherwise be serviced by service chain 28A.

Gateway 8 may determine that a service node has failed in any number of ways. For instance, gateway 8 may monitor the health of a service node using one or more protocols or applications such as ping or finger. Health monitoring may be based on an application such as Ceilometer that collects measurements of the utilization of the physical and virtual resources, stores and/or transmits these data for analysis, and triggers actions when defined criteria are met. Gateway 8 may send a message to a service node and expect a response within a defined duration of time. If a message from gateway 8 is sent to the service node and a response from the service node is not received by gateway 8 within the defined duration of time, then gateway 8 may determine that the service node has failed. In some examples, if a failure occurs at a service node, the service node or service appliance may asynchronously send a message indicating a failure to gateway 8. The message may notify gateway 8 of the failure in response to the service node or service appliance detecting the failure.

In other examples, gateway 8 may receive performance metrics information from a service node that indicates the performance of the service node as it applies services. Example metrics may include, but are not limited to: packets serviced per time period (e.g., packets per second), processor usage, memory usage, dropped packets, and packet queuing back pressure, to name only a few examples. If a metric satisfies a threshold (e.g., is greater than a maximum threshold or less than a minimum threshold), gateway 8 may determine that the service node has failed. As such, in some examples gateway 8 may, based on determining that a metric satisfies a threshold, load balance data sessions or packet flows to different service chains, where each of the different service chains are providing same services. Gateway 8 may apply such techniques, respectively, to one or more services nodes.

In the example of FIG. 1, gateway 8 may that determine service node 10N has failed. That is gateway 8 may determine that a failure has occurred at service node 10N included in a first plurality of service nodes 10A, 10B, 10N. A previously described, the first plurality of service nodes 10A, 10B, 10N are configured to apply one or more stateful services of a primary service chain 28A to packet flows from a plurality of subscriber devices 16. In response to determining that service node 10N has failed, gateway 8 may use the service node dependency table to determine which service chains include a service provided by service node 10N. For each service chain that includes a service provided by service node 10N, gateway 8 may determine if a corrective action is available to service the packets that would otherwise be serviced using primary service chain 28A. If no corrective action is available, gateway 8 may drop such packets at gateway 8.

In accordance with techniques of the disclosure, if a corrective action that indicates an alternate service chain is available to service the packets that would otherwise be serviced using primary service chain 28A, gateway 8 may configure its forwarding state to forward the packet flows (that would otherwise be serviced using primary service chain 28A) to a second plurality of service nodes 12N, 12C, 12A that are configured to apply one or more stateful services of alternate service chain 30A to the packets that would otherwise be serviced using primary service chain 28A. In this way, if a failure occurs at service node 10N having an ordinality greater than the ordinalities of service nodes 10A and 10B, future processing of packets may be avoided at service nodes 10A and 10B. Accordingly, if service node 10N has failed, service nodes 10A and 10B will no longer receive and apply respective services to network packets because such packets are now sent to alternate service chain 30A. Such processing by service nodes 10A and 10B that would otherwise be wasteful and/or introduce delays in packet processing may therefore be reduced or eliminated.

In response to receiving a subsequent subscriber packet that satisfies a condition for a policy to apply the services of service chain 28A, gateway 8 forwards the subscriber packet to the second plurality of service nodes 12N, 12C, 12A that apply the services of service chain 30A. In the example of FIG. 1, service nodes 12N, 12C, 12A apply the same set of services that service nodes 10A, 10B, and 10N applied to network packets. As such, subscriber packets that would have otherwise been serviced by primary service chain 28A receive the same set of services in alternate service chain 30A. Therefore, rather than dropping such packets due a failure of service node 10N in primary service chain 28A, gateway 8 may forward such packets to backup service chain 30A and still have the same set of services applied to the packet.

Although service nodes 10 and 12 are illustrated for example purposes on separate service appliances 9 and 11, in some examples, one or more of service nodes 10 and 12 may reside on the same service appliance. In some examples, one or more of service nodes 10 and 12 may reside on other devices, such as gateway 8 or another network-connected device not shown in FIG. 1. In FIG. 1, service appliance 9 may include a hypervisor that manages and controls one or more or virtual environments. One or more service nodes may be implemented and run in one or more respective virtual environments. In some examples, the hypervisor may internally send, forward, or route a network packet from one service node to the next in a service chain, based at least in part on a service chain identifier, which may allow the hypervisor to determine which service nodes will apply services to a packet. Further details of techniques of the disclosure are described herein.

Figure 2:
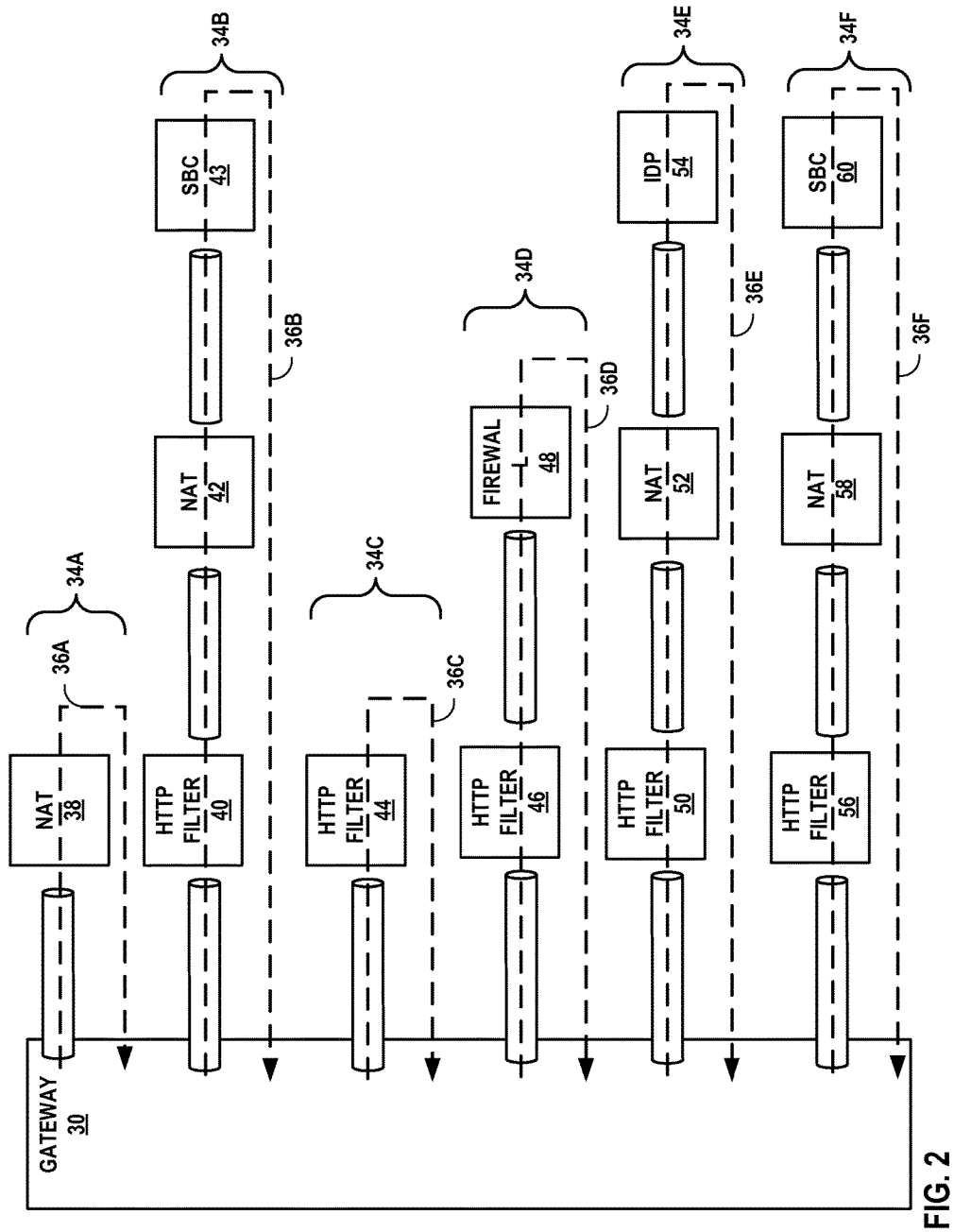
FIG. 2 is a block diagram illustrating an example set of service chains, in accordance with techniques described herein.

FIG. 2 is a block diagram illustrating an example set of service chains, in accordance with techniques described herein. In particular, FIG. 2 illustrates a set of service chains 34A-34F ("service chains 34") supported by gateway 30. Gateway 30 may, in one example, represent gateway 8 of FIG. 1 such that service chains 34 represent an example set of one or more service chains provided by service nodes 10 and/or 12.

In this example, one or more subscriber packet flows 36A are directed along a first service chain 34A to receive network address translation (NAT) service 38. Similarly, one or more subscriber packet flows 36B are directed along a second service chain 34B for application of an HTTP filter service 40, NAT service 42 and session border controller (SBC) services 43 for voice over IP (VoIP) processing and control. In service chain 34C, packet flows 36C are directed only to HTTP filter service 44. In service chain 34D, packet flows 36D are directed to HTTP filter 46 and subsequently to firewall service 48. As another example, packet flows 36E are directed along service chain 34E for application of HTTP filter 50, NAT 52 and intrusion detection and prevention (e.g., deep packet inspection) service 54. One or more subscriber packet flows 36F are directed along a service chain 36B for application of an HTTP filter service 56, NAT service 58 and session border controller (SBC) services 60 for voice over IP (VoIP) processing and control.

In accordance with techniques of the disclosure, service chain 34B may be a primary service chain. Service chain 34F may be an alternate service chain that provides the same services as service chain 34B. As such, in the event that a service node of service chain 34B fails, service chain 34F may apply the same set of services to packets that would have otherwise been applied in service chain 34B. Accordingly, gateway 8 may configure its forwarding state to initially apply services of service chain 34B, and if a failure occurs at a service node of service chain 34B, gateway 8 may reconfigure its forwarding state to use service chain 34F to apply the same set of services to packets.

Figure 3:
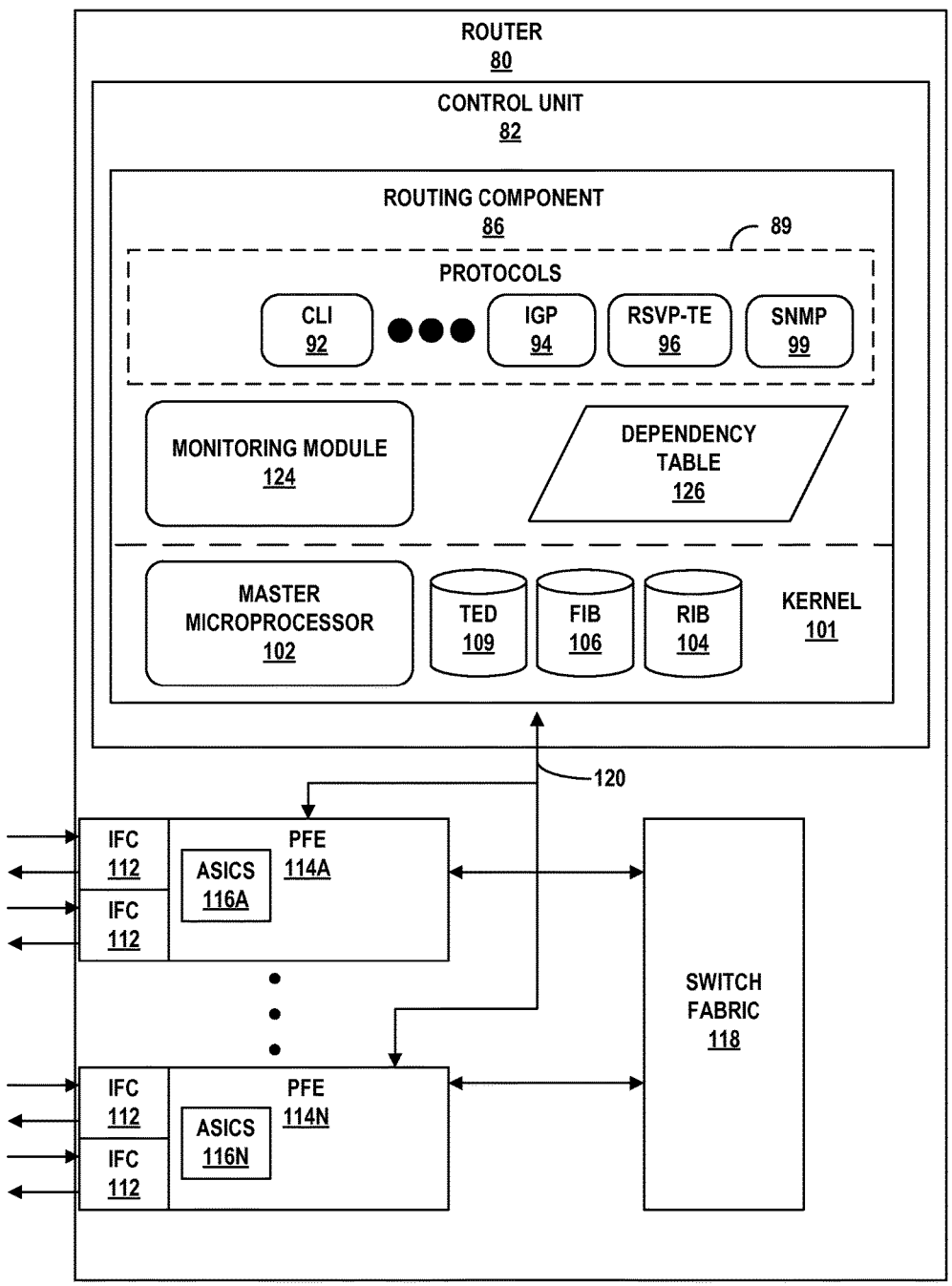
FIG. 3 is a block diagram illustrating an exemplary network device that implements techniques described herein, in accordance with techniques described herein.

FIG. 3 is a block diagram illustrating an exemplary network device that implements techniques described herein, in accordance with techniques described herein. Network device 80 may comprise any router in a network, such as SP network 2. For example, network device 80 may comprise gateway 8, an edge router, a core router or other device illustrated in FIGS. 1-2 that directs packet flows to a service complex for application of network services.

In the example of FIG. 3, network device 80 includes control unit 82 in which routing component 86 provides control plane functionality for network device 80. Network device 80 also includes a plurality of packet-forwarding engines 114A-114N ("PFEs 114" or "forwarding units") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of network device 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of network device 80 using text-based commands. Simple Network Management Protocol daemon 99 ("SNMP 99") comprises an SNMP agent that receives SNMP commands from a management entity to set and retrieve configuration and management information for network device 80. Using CLI 92 and SNMP 99, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In general, the routing information represents the overall topology of the network. IGP 94 interacts with kernel 101 (e.g., by way of API calls) to update RIB 104 based on routing protocol messages received by network device 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding state information included in FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network. Details on an example embodiment of a router that utilizes a radix tree for route resolution are provided in U.S. Pat. No. 7,184,437, the contents of which being incorporated herein by reference in its entirety.

Routing component 86 also provides an operating environment of one or more traffic engineering protocols to establish tunnels for forwarding subscriber packets through the ordered set of service nodes associated with different service chains. For example, RSVP-TE 96 may execute the Resource Reservation Protocol with Traffic Engineering extensions to exchange traffic engineering (TE) information, such as MPLS labels for enabling label-based packet forwarding. As another example, routing component 86 may use GRE or IP-based tunneling protocols to establish traffic engineered tunnels. Routing component 86 may maintain, for example, a traffic engineering database (TED) 109 to store the traffic engineering data.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of network device 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In the example of FIG. 3, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of network device 80. Operations may be performed, for example, on each packet based on any of a corresponding ingress interface, an ingress PFE 114, an egress PFE 30, an egress interface or other components of network device 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or mores service profiles associated with each subscriber, as may be received from an Authentication, Authorization and Accounting (AAA) server, a policy controller, SDN controller or other network element.

In accordance with techniques of the disclosure, network device 80 includes a monitoring module 124. Monitoring module 124 monitors the health of service nodes in a service chain and maintains the health of the service chain. Monitoring module 124 may determine that a service node has failed in any number of ways. For instance, monitoring module 124 may implement one or more protocols, such as ping or finger, to monitor the health of a service node. Monitoring module 124 may send a message to a service node and expect a response within a defined duration of time. As described in FIG. 1, if a message from monitoring module 124 is sent to the service node and a response from the service node is not received by monitoring module 124 within the defined duration of time, then monitoring module 124 may determine that the service node has failed. In some examples, if a failure occurs at a service node, the service node or service appliance may asynchronously send a message indicating a failure to monitoring module 124. The message may notify monitoring module 124 of the failure in response to the service node or service appliance detecting the failure.

In other examples, monitoring module 124 may receive performance metrics information from a service node that indicates the performance of the service node as it applies services. As described in FIG. 1, if a metric satisfies a threshold (e.g., is greater than a maximum threshold or less than a minimum threshold), monitoring module 124 may determine that the service node has failed. As such, in some examples monitoring module 124 may, based on determining that a metric satisfies a threshold, load balance data sessions or packet flows to different service chains, where each of the different service chains are providing same services. Monitoring module 124 may apply such techniques, respectively, to one or more services nodes.

As described in FIG. 1, network device 80 picks a service chain for a data session (e.g., for a particular subscriber, type of subscriber, or particular type of packet flow to name only a few examples) based on the Policy and Charging Reference Function (PCRF) inputs. PCRF provides the following information to network device 80 per policy and charging rule (PCC Rule): (1) Primary service chain ID (2) Service Node failure action (Drop/Forward without services or Secondary Service chain ID). In some examples, network device 80 may receive PCRF inputs from policy control server 14. For instance, network device 80 may receive PCRF inputs for a data session prior to a data session being initiated, in response to the initiation of a data session (e.g., receiving a packet in a packet flow), or after the data session has been initiated.

As shown in FIG. 3, routing component 86 may also include a dependency table 126. Although shown as a single table in FIG. 3, routing component may include any number of dependency tables. As described in FIG. 1, dependency table 126 may include a service chain identifier and identifiers of one or more services associated with the particular service chain identifier. In some examples, monitoring module 124 builds dependency table 126 based on the services provided by an administrator or operator. The following Table 1 identifies the services that are dependent on its predecessor services in a service chain:

TABLE 1

| Service Chain Identifier | Service Chain |
| --- | --- |
| S1 | DPI, PCEF, NAT |
| S2 | DPI, FW, NAT |
| S3 | DPI, HCM, NAT |
| S4 (alternate to S1) | DPI, PCEF, NAT |

As an example, a service chain identifier S1 includes a service chain, wherein the service chain includes deep-packet inspection (DPI), Policy and Charging Enforcement Function (PCEF), and Network Address Translation (NAT) services. Other services may include firewall (FW) and HTTP Content Management (HCM).

An administrator or operator may configure a primary service chain at a first service appliance with a corresponding service chain identifier S1 included in the service node dependency table. In addition to configuring the primary service chain identified by service chain identifier S1, the administrator or operator may also configure, as a corrective action, an alternate service chain at a second service appliance with a corresponding service chain identifier S4 included in the service node dependency table. The administrator or operator may configure alternate service chain at the second service appliance with a corresponding service chain identifier S4 included in the service node dependency table. In some examples, the alternate service chain may provide an alternative service chain to the primary service chain. For instance, the alternate service chain identified by S4 includes same set of services as primary service chain S1. In other examples, the alternate service chain may provide a subset or superset of the services included in the primary service chain.

In accordance with techniques of the disclosure, routing component 86 may configure one or more filters for a particular data session. In the example of FIG. 3, routing component 86 may configure forwarding state information in FIB 106 to forward network traffic for a particular subscriber to the first service appliance to have services of the primary service chain identified by S1 applied to the subscriber packet flow. Routing component 86 may also configure forwarding state information in FIB 106 to forward network traffic for the particular subscriber to the second service appliance to have services of the alternate service chain identified by S4 applied to the subscriber packet flow, if a failure occurs at a node providing a service in primary service chain.

To reroute network packets in the event of a service node failure, routing component 86 may configure FIB 106 to include a next hop list that is referenced by a leaf node of a radix tree included in FIB 106. A next hop list may include one or more entries, where one of the entries is active and the remaining entries are inactive. When a packet for the particular subscriber is received by network device 80, the subscriber identifier resolves to the leaf node of the radix tree that includes the next hop list. The next hop list may specify (1) a first entry that identifies the primary service chain (2) a second entry that specifies an alternate service chain.

Routing component 86 may initially configure the first entry in the next hop list as active, and the second entry in the next hop list as inactive. Accordingly, when one or more of ASICS 116 are configured by PFEs 114 based on FIB 106, packets that match the filter for the particular subscriber are forwarded to the first service appliance, such that the primary service chain is applied to the packets. More specifically, when a packet is received from the particular subscriber, one of ASICs 116 may determine that a condition of the filter is satisfied for the subscriber identifier (e.g., the subscriber identifier matches the filter condition). The ASIC may determine that the active element in the next hop list that corresponds to the filter, identifies the primary service chain. The ASIC may determine the primary service chain identifier S1 from the action for the filter, and, based on the action, send the packet to the first service appliance with the service chain identifier. The first service appliance may then apply the services in the service chain to the packet based on the service chain identifier and send the packet back to network device 80 for forwarding.

In the example of FIG. 3, monitoring module 124 may that determine a service node of the first service appliance has failed. As such, the first service appliance may no longer be able to apply the service chain for identifier S1 to packets for the particular subscriber. In the example of FIG. 3, the NAT service of the service chain for identifier S1 may have failed. Accordingly, monitoring module 124 may send data indicating the failure of the service node to one or more of PFEs 114 that are configured to forward packets to the first service appliance using the primary service chain. The one or more of PFEs 114 may configure respective AISCs 116, such that the respective next hop lists set the first entry that identifies the primary service chain as inactive and the second entry that specifies an alternate service chain as active. In this way, as packets are received by the one or more of PFEs 114 from the particular subscriber, the packets are steered or otherwise forwarded to the second service appliance that applies the services of the alternate service chain associated with the service identifier S4. Accordingly, when the service node on the first service appliance fails, the service nodes for the primary service chain will no longer receive and apply respective services to network packets because such packets are now sent to the alternate service chain. Such processing by service nodes of the primary service appliance that would otherwise be wasted and/or introduce delays in packet processing may therefore be reduced or eliminated.

In the example of FIG. 3, responsive to determining that the NAT service has failed, monitoring module may determine each service chain in dependency table 126 that includes a NAT service applied by the failed service node. For instance, service chains S2 and S3 may also include the NAT service applied by the failed service node. As such, monitoring module 124 may take one or more corrective actions, as with the service chain for identifier S1. For instance, a corrective action for service chain S2, in the event of a service node failure, may include forwarding network packets, which would otherwise be processed with the services of service chain S2, to the destination without applying any services to the network packets. A corrective action for service chain S3, in the event of a service node failure, may include dropping network packets, which would otherwise be processed with the services of service chain S2, at network device 80. Accordingly, as described with respect to service chains S1, monitoring module 124 may send data indicating the failure of the service node to one or more of PFEs 114 that are configured to forward packets to the first service appliance using the primary service chain. The one or more of PFEs 114 may configure respective AISCs 116, such that the corrective actions are applied for service chains S2 and S3. As such, network device 80 may in response to determining that the failure has occurred, identify a set of service chains that each includes a service provided by the service node that has failed, and configure network device 80 to process the packet flows from the plurality of subscriber devices based on respective corrective actions for each respective service chain.

As described in this disclosure, network device 80 may build dependency table 126 and optimize the processing, which may result in: (1) creating dynamic service chains based on available/functional services, and there by avoid unnecessary drops (2) identifying critical services and drop the packets early, in case any of the critical service is down. Dependency table 126 may also be further extended to: (a) location based dependency table—for each location (city), a separate dependency table can be created, (b) roaming status of subscriber—difference service chains and hence different dependency tables can be used by network device 80 to select an alternate service chain, and/or (3) time of day based service chain, to name only a few examples. For instance, network device 80 may select a particular alternate service chain based on a time of day. More generally, the corrective action may therefore be based on location of a subscriber for the packet flow and/or network device 80, a roaming status of a subscriber, and/or a time of day.

In some examples, a weight can be assigned to each service in the dependency table when building alternate service chains for when certain services are unavailable. For instance, an administrator or operator may assign a weight, which is included in a range of weights, to a particular service in a service chain. In some examples, one or more services in a service chain may be each be assigned a weight. For service chains having a cumulative weight that satisfies a threshold value (e.g., greater than or less than the threshold value), network device 80 may perform one type of corrective action, e.g., applying an alternative service chain in the event of a failure, while for service chains having a cumulative that does not satisfy the threshold, network device 80 may apply a different type of corrective action, such as dropping packets or forwarding the packets to the destination without applying one or more services. In some examples, a weight for a service may be based on a time, location of network device 80, location of a subscriber, or roaming status of a subscriber to name only a few examples.

The architecture of network device 80 illustrated in FIG. 3 is shown for example purposes only. This disclosure is not limited to this architecture. In other examples, network device 80 may be configured in a variety of ways. In one example, some of the functionally of control unit 82 may be distributed within IFCs 34. Control unit 82 may be implemented solely in software, or hardware, or may be implemented as a combination of software, hardware, or firmware.

For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
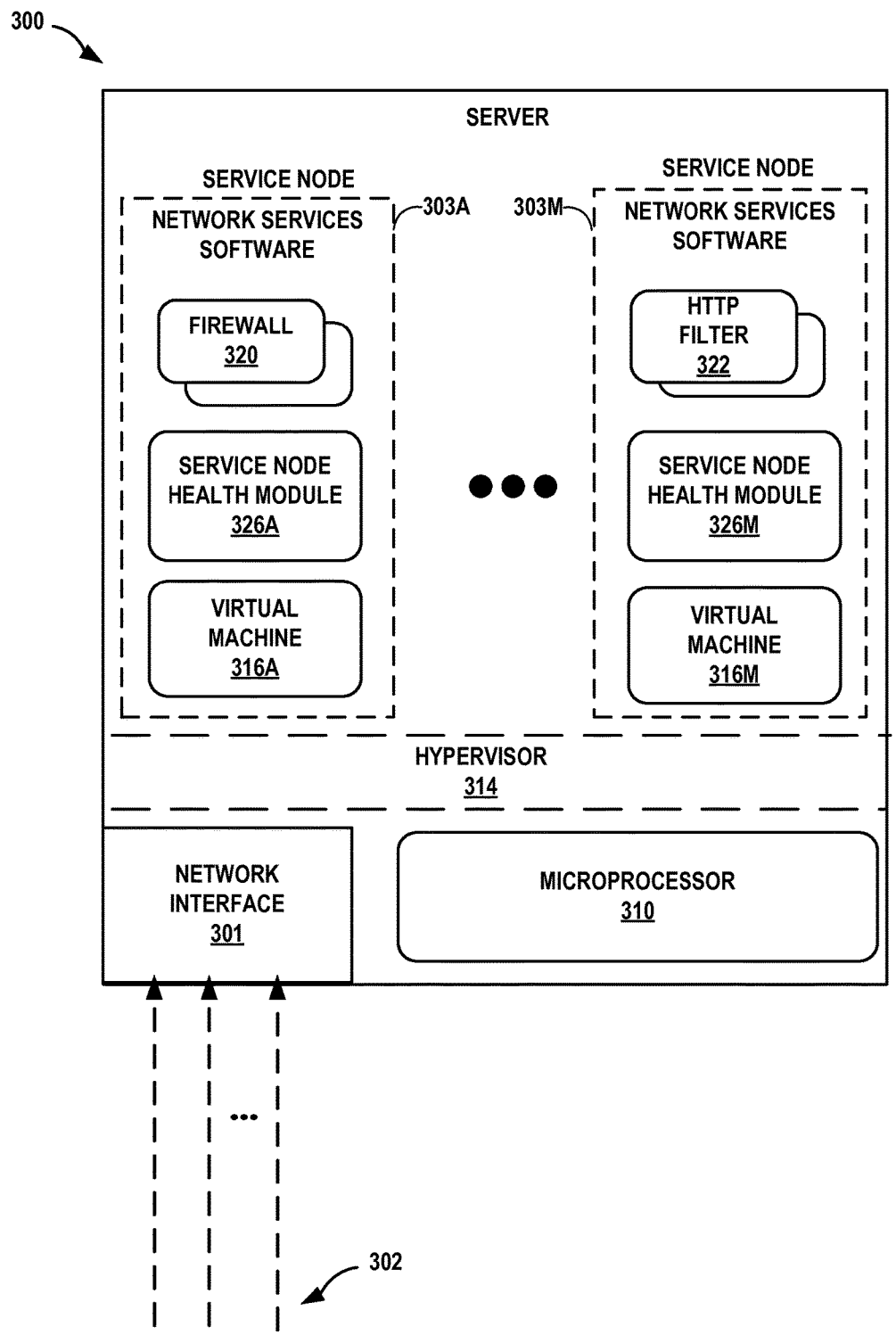
FIG. 4 is a block diagram illustrating an example server that provides an operating environment for one or more service nodes, in accordance with techniques described herein.

FIG. 4 is a block diagram illustrating an example server 300 that provides an operating environment for one or more service nodes 303A-303M ("service nodes 303"), in accordance with techniques described herein. In this example, server 300 includes a network interface 301 to receive multiple packet flows 302. Each of packet flows 302 corresponds to different one of a plurality of service chains, where each of the service chains comprises a different ordered set of one or more stateful network services to be applied to packet flows associated with subscribers.

In the example of FIG. 4, server 300 includes a microprocessor 310 executing hypervisor 314 to provide an execution environment for one or more virtual machines 316A-316M that provide termination points for packet flows 302. Each of the virtual machines executes network services software, such as firewall instance 320 and HTTP filter instance 322, to apply one or more of the stateful network services to the packet flows. The network services software executing on virtual machines 316 is able to associate each of the subscriber packets transported via packets with a corresponding subscriber packet flow based on a subscriber identifier. Each packet or packet flow may include a service chain identifier.

In accordance with techniques of the disclosure, server 300 may include one or more service node health modules (SNHMs) 326A-326M. SNHMs 326 may be implemented in hardware, software or a combination of hardware and software. SNHMs 326 may implement one or more protocols (e.g., ping or finger) for communicating with a gateway, such as gateway 8 and gateway 80 in FIGS. 1-2. In the example of FIG. 4, each of service nodes 303 includes a respective SNHM that provides response messages within a defined time duration, asynchronous messages that the node has failed, and/or node health information to gateway 8. In other examples, server 300 may include one SNHM that provides response message and node health information to a gateway on behalf of all the services.

In the example of FIG. 4, SNHM 316A may receive a message from gateway 8, which requires a response within a defined duration of time to gateway 8. If service node 303A has not failed, SNHM 326A sends a response message with the defined time duration, such that gateway 8 determines that service node 303A has not failed. If, however, service node 303A has failed, SNHM 326A may not send a response within the defined duration of time. Accordingly, gateway 8 may not receive a response within the defined duration of time and determine that service node 303A has failed. As described in FIG. 1, gateway 8 may receive health information (e.g., performance metrics) from SNHMs 326 in some examples. For instance, SNMA 326A may send one or more of the following information to gateway 8: packets serviced per time period (e.g, packets per second), processor usage, memory usage, dropped packets, and packet queuing back pressure information, to name only a few examples. In this way, gateway 8 may determine whether a threshold is satisfied based on the health information to determine whether a service node has failed.

In accordance with techniques of the disclosure, server 300 may receive a packet flow for a particular subscriber that includes a service chain identifier. The service chain identifier may correspond to a particular set of services provided by at least service node 303A and service node 303M. Hypervisor 314 and/or one or more of virtual machines 316 may steer or otherwise forward packets of the packet flow to each respective service node, including nodes 303A and 303M, as specified by the service chain identifier. For instance, hypervisor 314 and/or one or more of virtual machines 316 may include data indicating associations between a service identifier and each service for the service identifier to steer or otherwise forward packets between the service nodes. In some examples, server 300 may receive the data indicating the associations from gateway 8. SNHM 326M may receive messages from gateway 8 requiring a response within a defined duration of time, and SNHM 326M may send responses within the defined duration of time because SNHM 326M has not failed.

At a later time, service node 303M may experience a failure, such that service node 303M cannot apply the HTTP filter service to packet flows for the particular subscriber. In the example of FIG. 4, gateway 8 may send messages to service node 303M requiring a response within a defined time duration; however, SNHM 326M may no longer send responses within the defined time duration because service node 303M has failed. Gateway 8, in accordance with techniques of the disclosure may configure its forwarding state to send packets for the particular subscriber to a different set of services nodes for an alternative service chain. In this way, gateway 8 will not continue to send packets to service node 303M, which has failed. Accordingly, techniques of the disclosure may prevent or reduce packets from being dropped at service node 303M because it has failed.

Figure 5:
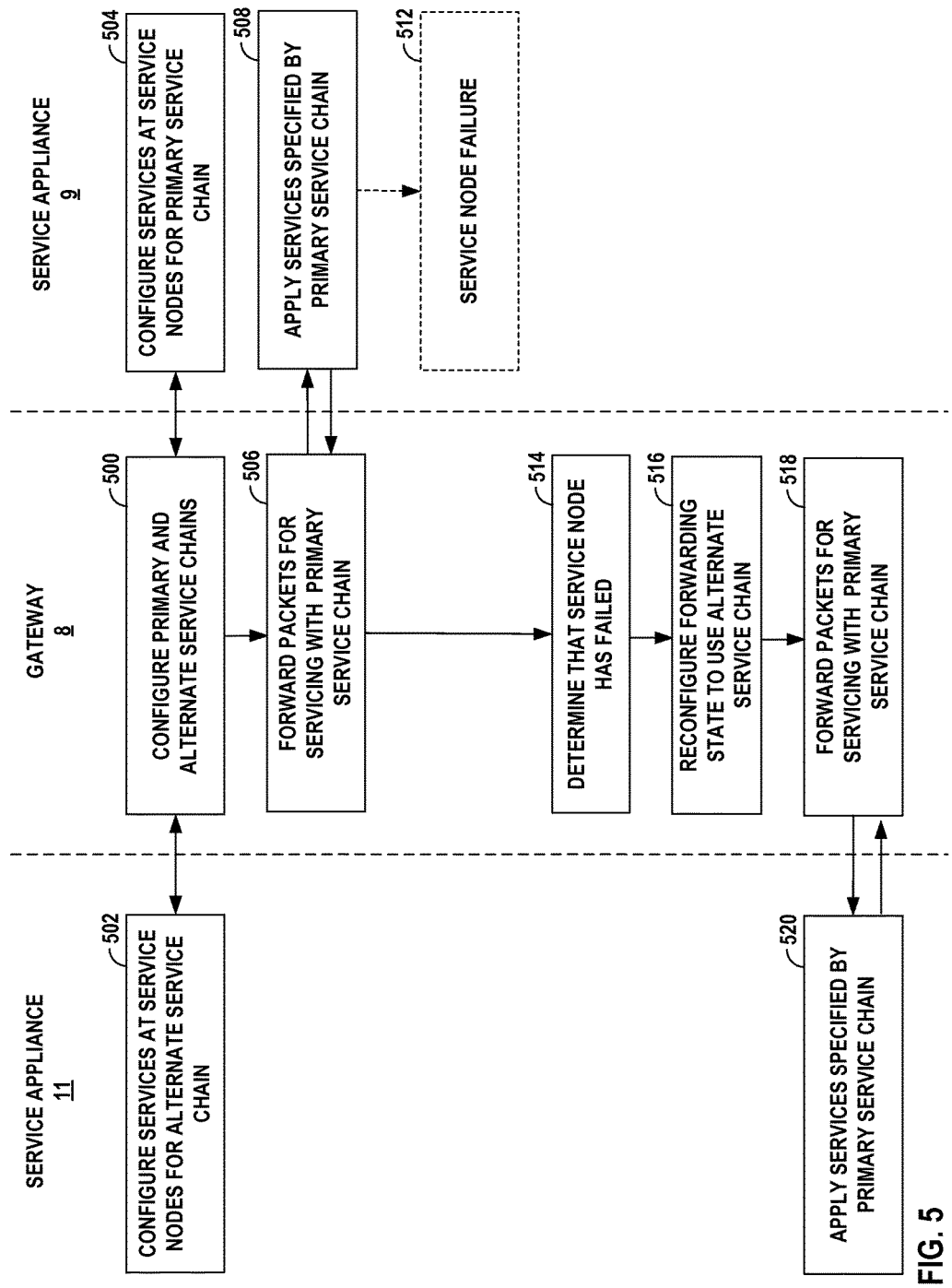
FIG. 5 is flowchart illustrating example operations of a network device, in accordance with techniques of the disclosure.

FIG. 5 is flowchart illustrating example operations of a network device, in accordance with techniques of the disclosure. For purposes of illustration, the example operations are described below within the context of gateway 8 of this disclosure. Gateway 8 may initially receive one or more user inputs to configure one or more primary and/or alternate service chains. For instance, an administrator or operator of gateway 8 and service appliances 9 and 11 may configure a primary service chain at service appliance 9 and an alternate service chain at service appliance 11 (500). The administrator or operator may configure gateway 8 to forward packets based on subscriber policies to the services appliances based on service chains that correspond to the policies. The administrator or operator may configure service appliance 9 to provide services based on a primary service chain (504) and may configure service appliance 11 to provide services based on the alternate service chain (502). In the example of FIG. 5, the alternate service chain may provide the same set of service as primary service chain. In some examples, as part of configuring the primary and alternate service chains, service appliances 9 and 11 may exchange information with gateway 8. For instance, service appliance 9 and 11 may exchange information that includes, but is not limited to, a service chain identifier for a respective service chain and data that indicates each of the services in the service chain. In this way, when a service appliance receives a packet and corresponding service chain identifier, the service appliance may apply the respective services of the service chain.

In the example of FIG. 5, gateway 8 may initially be configured to forward subscriber packets for a subscriber using the primary service chain. Gateway 8 may be further configure to forward the subscriber packets to service appliance 11 for processing with the alternate service chain if a service node failure occurs for a service node in the primary service chain at service appliance 9. Gateway 8 may receive subscriber packets, and based on filters configured according to policies for subscribers, forward the subscriber packets to service appliance 9 (506). Each service node for the primary service chain may apply its respective service to subscriber packets that correspond to the primary service chain (508). Upon applying each service to the subscriber packet, service appliance 9 may forward the packet to gateway 8, which forwards the subscriber packet to public network 20.

At a later time, a service node that applies a service in the primary service chain may fail (512). Gateway 8 may determine that the service node has failed, in accordance with one or more techniques described in this disclosure (514). For instance, the service node may not send a response message to gateway 8 within a defined duration of time. In another example the service node may send an asynchronous message to gateway 8 indicating the failure of the node. In still another example, gateway 8 may receive health information, which satisfies a threshold that indicates the service node has failed. In any case, upon determining that the service node has failed, gateway 8 may reconfigure its forwarding state to steer or otherwise forward the subscriber packets for the subscriber to service appliance 11 (516). In this way, subscriber packets for the subscriber will not be sent to service appliance 9, where the packets would otherwise be dropped because of the failed service node.

As gateway 8 receives subscriber packets from a subscriber 16, gateway 8 steers or otherwise forwards the subscriber packets to service appliance 11 (518). Service appliance 11 may receive the subscriber packets and apply the services that correspond to the alternate service chain (520). That is, each service node corresponding to a service in the alternate service chain may apply its respective service to the subscriber packet. Service appliance 11 may then forward the subscriber packet back to gateway 8, which forwards the subscriber packet to public network 20.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   determining, by a network device of a service provider network, that a failure has occurred at a service node included in a plurality of service nodes, the plurality of service nodes configured to apply one or more stateful services of a primary service chain to packet flows from a plurality of subscriber devices;
   in response to determining that the failure has occurred, identifying, by the network device, one or more other service chains that also include the one or more stateful services applied by the failed service node;
   in response to identifying the one or more other service chains that also include the one or more stateful services, configuring, by the network device, forwarding state of the network device to process the packet flows from the plurality of subscriber devices based on a first corrective action that bypasses the service node for the primary service chain and configuring the forwarding state of the network device to process the packet flows from the plurality of subscriber devices based on a second corrective action that bypasses the service node for at least one of the identified one or more other service chains, wherein the second corrective action is different than the first corrective action; and
   in response to receiving a subscriber packet in the packet flows, processing the packet flows from the plurality of subscriber devices based on the forwarding state of the network device.

2. The method of claim 1,
   wherein configuring the forwarding state of the network device to process the packet flows based on one of the first or second corrective action comprises configuring the forwarding state of the network device to forward the packet flows from the plurality of subscriber devices to a second plurality of service nodes that are configured to apply one or more stateful services of an alternate service chain to the packet flows from the plurality of subscriber devices; and wherein processing the packet flows from the plurality of subscriber devices based on the forwarding state of the network device comprises forwarding the subscriber packet to the second plurality of service nodes.

3. The method of claim 1, wherein configuring the forwarding state of the network device to process the packet flows based on one of the first or second corrective action comprises configuring the forwarding state of the network device to one of drop the packets in the packet flows or forward the packet flows without applying the one or more stateful services.

4. The method of claim 1, further comprising:
sending, by the network device and to the service node, a message that requests a response from the service node within a defined time duration;
determining, by the network device, that the service node has not sent the response within the defined time duration; and
wherein determining that the failure has occurred comprises determining that the failure has occurred based at least in part on not receiving the response within the defined time duration.

5. The method of claim 1, further comprising:
receiving, by the network device and from a computing device that includes the service node, a message that indicates the service node has failed; and
wherein determining that the failure has occurred comprises determining that the failure has occurred based at least in part on the message that indicates the service node has failed.

6. The method of claim 1, further comprising:
receiving, by the network device, a performance metric that indicates a performance of the service node;
determining, by the network device, that the performance metric satisfies a threshold; and
wherein determining that the failure has occurred comprises determining that the failure has occurred based at least in part on determining that the performance metric satisfies a threshold.

7. The method of claim 1,
wherein the forwarding state of at least one forwarding unit of the network device includes a next hop list that corresponds to the packet flows from the plurality of subscriber devices, wherein the next hop list includes a first element that indicates the primary service chain and a second element that indicates an alternate service chain, the method further comprising:
prior to determining that the failure has occurred:
configuring, by the network device, the first element as the active element in the next hop list; and
in response to determining that the failure has occurred:
configuring, by the network device, the second element as the active element in the next hop list.

8. The method of claim 7, wherein the alternate service chain includes each of the same one or more stateful services that is included in the primary service chain.

9. The method of claim 1, wherein each of the first or second corrective action is based at least in part on a location of the plurality of subscriber devices for the packet flows, a location of the network device, a roaming status of the plurality of subscriber devices, or a time of day.

10. The method of claim 1, wherein the first corrective action is based at least in part on a first set of weights associated with a first set of services provided by each of the plurality of service nodes in the primary service chain, and wherein the second corrective action is based at least in part on a second respective set of weights associated with a second respective set of services provided by each of the plurality of service nodes in the at least one of the identified one or more other service chains.

11. A network device comprising:
a monitoring module that determines that a failure has occurred at a service node included in a plurality of service nodes, the plurality of service nodes configured to apply one or more stateful services of a primary service chain to packet flows from a plurality of subscriber devices;
a control unit that:
in response to determining that the failure has occurred, identifies one or more other service chains that also include the one or more stateful services applied by the failed service node;
in response to identify the one or more other service chains that also include the one or more stateful services, configures a forwarding state of the network device to process the packet flows from the plurality of subscriber devices based on a first corrective action that bypasses the service node for the primary service chain and configures the forwarding state of the network device to process the packet flows from the plurality of subscriber devices based on a second corrective action that bypasses the service node for at least one of the identified one or more other service chains, wherein the second corrective action is different than the first corrective action; and
a forwarding unit that, in response to receiving a subscriber packet in the packet flows, processes the packet flows from the plurality of subscriber devices based on the forwarding state of the network device.

12. The network device of claim 11,
wherein the control unit configures the forwarding state of the network device to forward the packet flows from the plurality of subscriber devices to a second plurality of service nodes that are configured to apply one or more stateful services of an alternate service chain to the packet flows from the plurality of subscriber devices; and
wherein the forwarding unit forwards the subscriber packet to the second plurality of service nodes.

13. The network device of claim 11,
wherein the control unit configures the forwarding state of the network device to one of drop the packets in the packet flows or forward the packet flows without applying one or more stateful services.

14. The network device of claim 11,
wherein the monitoring module sends, to the service node, a message that requests a response from the service node within a defined time duration;
wherein the monitoring module determines that the service node has not sent the response within the defined time duration; and
wherein the monitoring module determines that the failure has occurred based at least in part on not receiving the response within the defined time duration.

15. The network device of claim 11,
wherein the monitoring module receives, from a computing device that includes the service node, a message that indicates the service node has failed; and wherein the monitoring module determines that the failure has occurred based at least in part on the message that indicates the service node has failed.

16. The network device of claim 11,
wherein the monitoring module receives a performance metric that indicates a performance of the service node;
wherein the monitoring module determines that the performance metric satisfies a threshold; and
wherein the monitoring module determines that the failure has occurred based at least in part on determining that the performance metric satisfies a threshold.

17. The network device of claim 11,
wherein the forwarding state of the forwarding unit includes a next hop list that corresponds to the packet flows from the plurality of subscriber devices, wherein the next hop list includes a first element that indicates the primary service chain and a second element that indicates an alternate service chain, wherein
prior to determining that the failure has occurred:
the control unit configures the first element as the active element in the next hop list; and
in response to determining that the failure has occurred:
the control unit configures the second element as the active element in the next hop list.

18. The network device of claim 17, wherein the alternate service chain includes each of the same one or more stateful services that is included in the primary service chain.

19. The network device of claim 11, wherein each of the first or second corrective action is based at least in part on a location of a subscriber for a packet flow, a location of the network device, a roaming status of a subscriber, or a time of day.

20. The network device of claim 11, wherein the first corrective action is based at least in part on a first set of weights associated with a first set of services provided by the plurality of service nodes in the service chain, and wherein the second corrective action is based at least in part on a second respective set of weights associated with a second respective set of services provided by each of the plurality of service nodes in the at least one of the identified one or more other service chains.

21. A non-transitory computer-readable medium comprising instructions for causing at least one programmable processor of a network device to:
determine that a failure has occurred at a service node included in a plurality of service nodes, the plurality of service nodes configured to apply one or more stateful services of a primary service chain to packet flows from a plurality of subscriber devices;
identify one or more other service chains that also include the one or more stateful services applied by the failed service node, in response to determining that the failure has occurred;
configure, in response to identifying the one or more other service chains that also include the one or more stateful services, forwarding state of the network device to process the packet flows from the plurality of subscriber devices based on a first corrective action that bypasses the service node for the primary service chain and configure the forwarding state of the network device to process the packet flows from the plurality of subscriber devices based on a second corrective action that bypasses the service node for at least one of the identified one or more other service chains, wherein the second corrective action is different than the first corrective action; and
process the packet flows from the plurality of subscriber devices based on the forwarding state of the network device, in response to receiving a subscriber packet in the packet flows.

* * * * *